US006931552B2

(12) United States Patent
Pritchard et al.

(10) Patent No.: US 6,931,552 B2
(45) Date of Patent: Aug. 16, 2005

(54) APPARATUS AND METHOD FOR PROTECTING A COMPUTER SYSTEM AGAINST COMPUTER VIRUSES AND UNAUTHORIZED ACCESS

(76) Inventors: James B. Pritchard, 660 Meandering Way, Fairview, TX (US) 75069; Clyde R. Calcote, 1009 Serenade La., Richardson, TX (US) 75081

( * ) Notice: Subject to any disclaimer, the term of this patent is extended or adjusted under 35 U.S.C. 154(b) by 775 days.

(21) Appl. No.: 09/847,757

(22) Filed: May 2, 2001

(65) Prior Publication Data

US 2002/0166067 A1 Nov. 7, 2002

(51) Int. Cl.[7] ........................... H04L 9/00; G06F 11/30; G06F 15/173; G06F 15/16
(52) U.S. Cl. ...................... 713/201; 713/165; 713/170; 713/188; 713/200; 713/202; 709/223; 709/224; 709/225; 709/229
(58) Field of Search ............................... 713/165, 170, 713/188, 200–202; 709/223–224, 225, 229

(56) References Cited

U.S. PATENT DOCUMENTS

| | | | |
|---|---|---|---|
| 3,699,529 A | 10/1972 | Beyers et al. ............. 340/172.5 |
| 5,434,562 A | * 7/1995 | Reardon ..................... 713/200 |
| 5,720,035 A | 2/1998 | Allegre et al. ......... 395/200.06 |
| 5,828,845 A | 10/1998 | Jagadish et al. ....... 395/200.59 |
| 5,832,208 A | 11/1998 | Chen et al. ............. 395/187.01 |
| 5,842,002 A | * 11/1998 | Schnurer et al. .............. 703/21 |
| 5,960,170 A | 9/1999 | Chen et al. ............. 395/183.14 |
| 5,987,610 A | 11/1999 | Franczek et al. ........... 713/200 |
| 6,003,084 A | 12/1999 | Green et al. ................ 709/227 |
| 6,088,802 A | 7/2000 | Bialick et al. .............. 713/200 |
| 6,088,803 A | 7/2000 | Tso et al. .................... 713/201 |
| 6,092,194 A | 7/2000 | Touboul ...................... 713/200 |
| 6,134,658 A | 10/2000 | Multerer et al. ............ 713/175 |
| 6,145,084 A | 11/2000 | Zuili et al. .................. 713/201 |
| 6,154,844 A | 11/2000 | Touboul et al. ............. 713/201 |
| 6,324,648 B1 | * 11/2001 | Grantges, Jr. ............... 713/201 |
| 6,401,210 B1 | * 6/2002 | Templeton .................. 713/200 |

OTHER PUBLICATIONS

Abreu, Sep. 27, 1999, Network World.*
Johnson, Jan., 1999, PC Computing, 116(1).*
Rubenking, Feb. 20, 1996, Windows 95 Antivirus Utilites: the Latest in PC Protection, PC Magazine, v15, n4, p39(3).*

* cited by examiner

*Primary Examiner*—Ayaz Sheikh
*Assistant Examiner*—Jenise Jackson

(57) ABSTRACT

There is disclosed an apparatus and method for protecting a first computer system against an intrusion such as a computer virus or an unauthorized access. The apparatus comprises a second computer system that is coupled to the first computer system in a manner that permits the second computer system to receive all computer communications that are directed to the first computer system. The second computer system detects an intrusion before the intrusion reaches the first computer system. The second computer system deletes the intrusion by deleting the operating system and all other data on the second computer system. After the compromised operating system and data have been erased, a clean version of the operating system and data is supplied to the second computer system from a restoration controller within the second computer system, or from the first computer system, or from a backup copy of the clean version of the data.

41 Claims, 4 Drawing Sheets

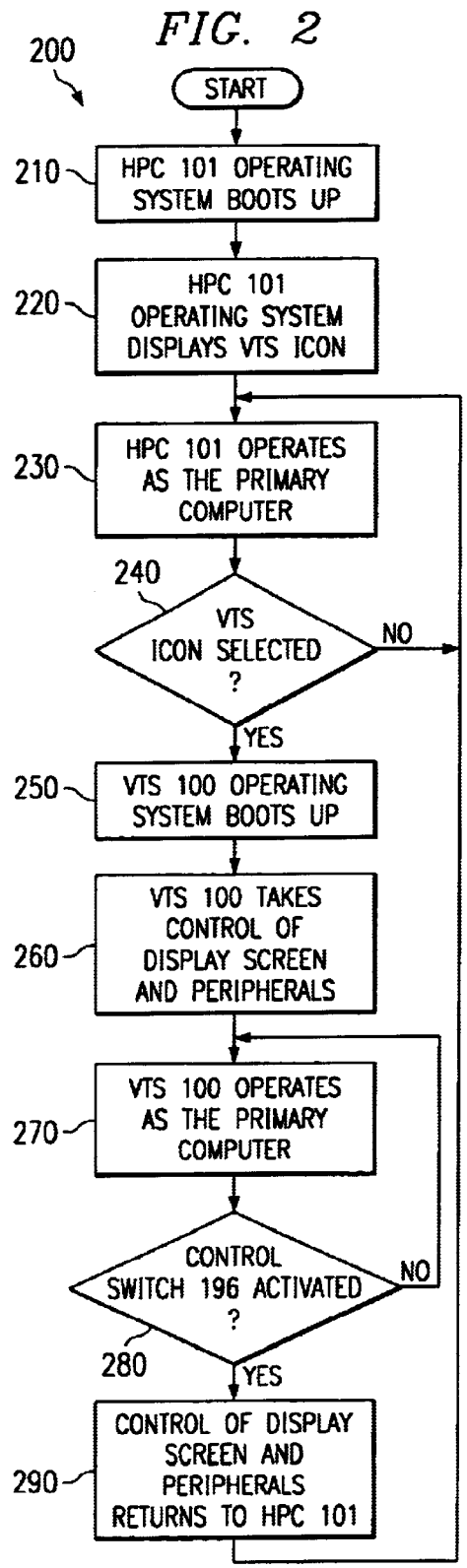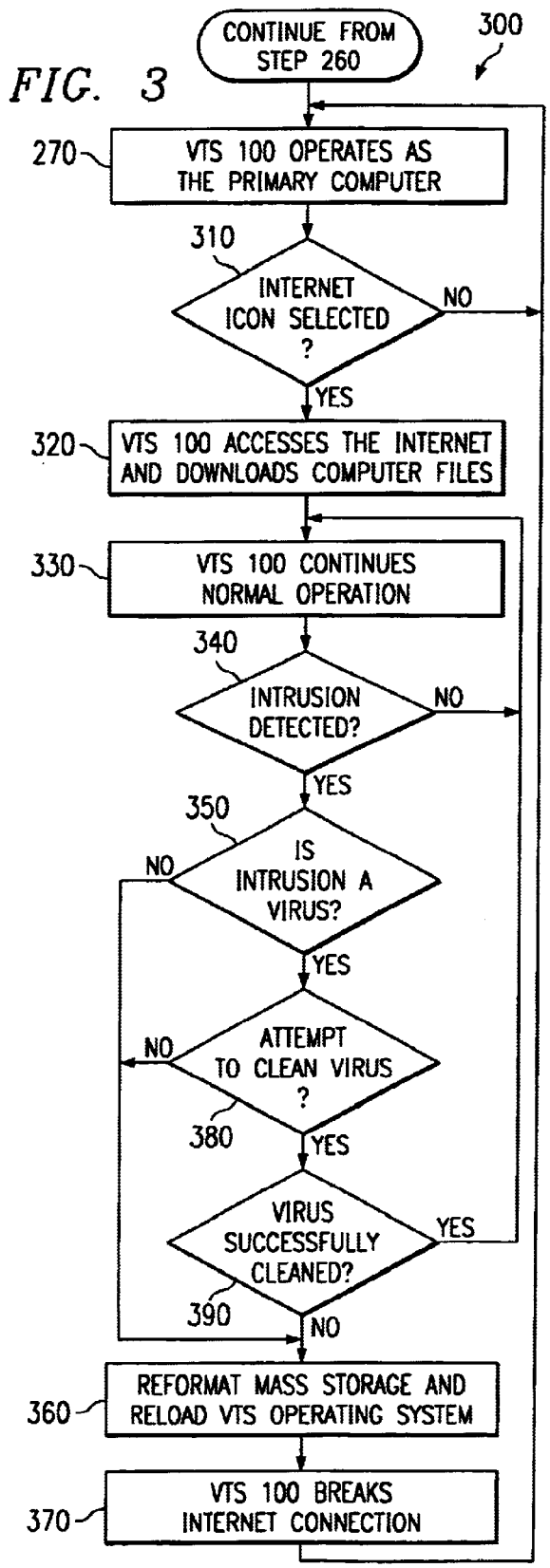

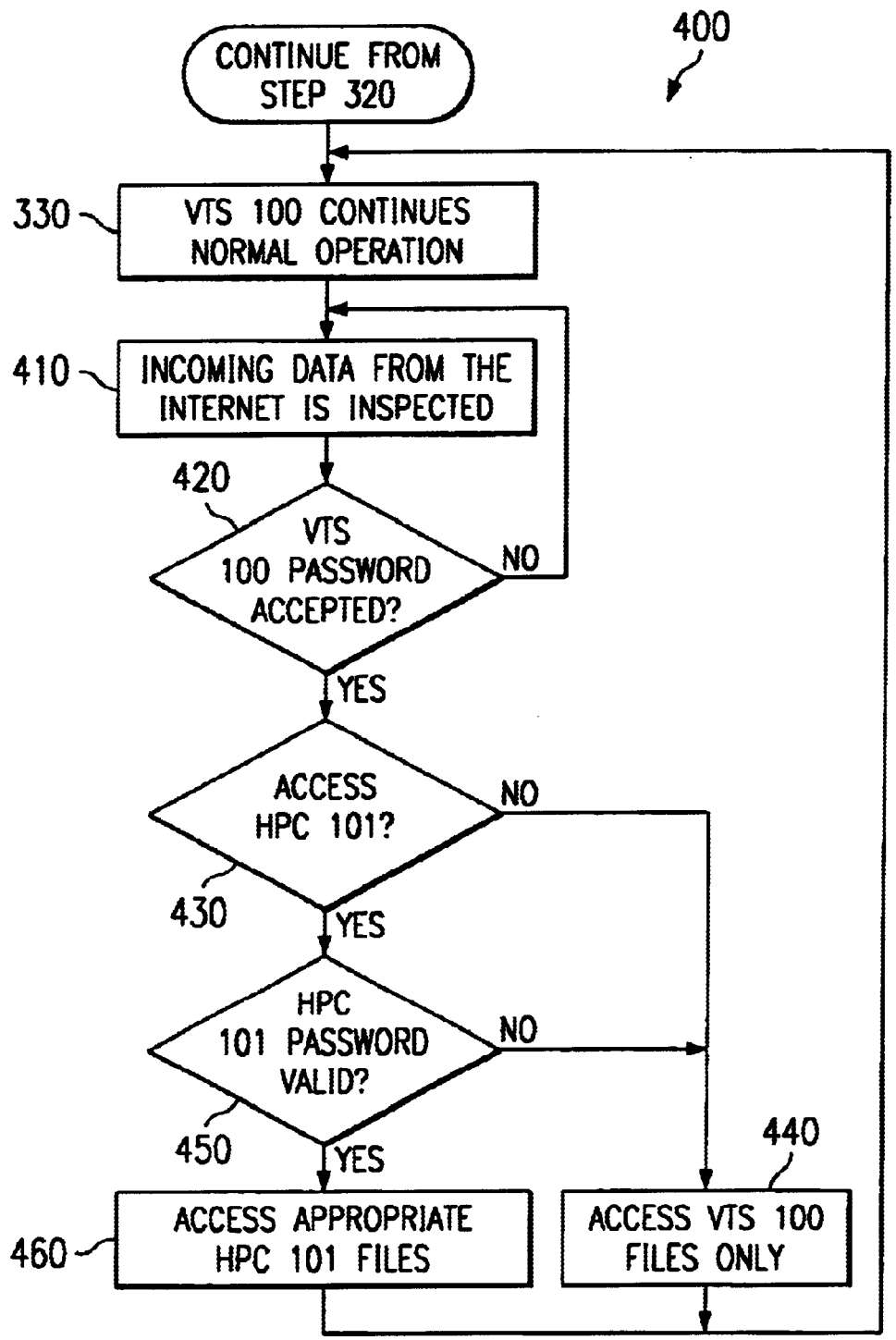

APPARATUS AND METHOD FOR PROTECTING A COMPUTER SYSTEM AGAINST COMPUTER VIRUSES AND UNAUTHORIZED ACCESS

TECHNICAL FIELD OF THE INVENTION

The present invention is directed, in general, to an apparatus and method for protecting a computer system and, more particularly, to an apparatus and method for protecting a computer system against computer viruses and unauthorized access.

BACKGROUND OF THE INVENTION

The Internet is a worldwide collection of thousands of computer networks and computers operated by governments, companies, universities and individuals connected through Internet Service Providers. The Internet has become a source of many "computer virus" application programs that are capable of damaging computer systems. Computer viruses are usually simply referred to as "viruses." Viruses are usually sent to a computer or network via the Internet in the form of files attached to seemingly innocent communications such as e-mails, graphics files, etc.

Individuals known as "hackers" are continually designing and creating executable virus programs. In response, other computer programmers are continually designing and creating virus detection programs and other types of security programs to counteract the virus programs. Originally, the term "hacker" meant a computer programmer with little or no formal training. The current popular definition of a hacker refers to individuals who gain unauthorized access to computer systems for the purpose of stealing and/or corrupting data. Hackers are known for breaking into supposedly secure computer systems and playing havoc with web sites, credit card accounts, internal databases, etc. Further, virus programmers have been known to e-mail destructive viruses to an unsuspecting computer where the virus that is sent is capable of attaching itself to the computer's e-mail program. The e-mail program then mails a copy of the virus to every address on the computer's e-mail list, thus replicating the virus many times over.

Virus attacks generally affect the data on a computer's hard drive. The attacked computer's system and application files are usually corrupted and the File Allocation Table (FAT) is altered. The Complementary Metal Oxide Semiconductor (CMOS) Random Access Memory (RAM) that contains the computer's configuration information is also a target of virus attacks. The main computer memory may be degraded by changing or deleting program address vectors. These types of virus attacks can cause complete computer shutdown with the loss of valuable time and data. In a network of connected computers, all the computers may be quickly infected by the introduction of a virus to one of the computers in the network. Corruption of the network server files may damage accounting, personnel, and customer databases. Trade secrets, marketing strategy, product designs and custom software may all be compromised or destroyed.

Hackers can gain access to personal computers that are connected to the Internet and steal passwords, bank account information, e-mail addresses, phone numbers, etc. After a hacker gets into a computer, information or data in that computer can no longer be considered to be private. Hackers can plant programs in the computer that can cause the computer to attack other computers. Hackers who gain access to business computers can cause very large financial losses through illegal fund transfers, customer list theft, password theft, trade secret theft, disruption of manufacturing processes, malicious alteration of data, total erasure of data, etc. Hackers have even been known to access educational institution databases to change grades and personal information of students.

Therefore, there is a need in the art for an apparatus and method to provide complete protection for a computer system against computer viruses. There is also a need in the art for an apparatus and method to provide complete protection for a computer system against computer attacks by hackers and other types of unauthorized access. In particular, there is a need in the art for an apparatus and method for providing complete protection for a computer system against computer viruses, computer attacks, and unauthorized access when the computer system is continually connected to an online network such as the Internet.

SUMMARY OF THE INVENTION

To address the above deficiencies of the prior art computer systems, it is a primary object of the present invention to provide an apparatus and method that will completely prevent computer viruses and unauthorized access attempts from successfully reaching a computer system. The computer system to be protected will be referred to as a host computer system.

In one advantageous embodiment, the apparatus of the present invention comprises a virus trap computer system that is coupled to the host computer system. The virus trap computer system is a fully functional computer system with its own central processing unit, memory, operating system, and mass storage device (e.g., hard disk drive). The virus trap computer system is also coupled to a computer network interface so that the virus trap computer system can access external computer networks such as the Internet. The host computer system is not coupled to a computer network interface and therefore cannot be accessed by any computer other than the virus trap computer system. The virus trap computer system protects the host computer system by receiving all external computer communications that are directed to the host computer system. That is, all external computer communications must first enter the virus trap computer system.

Computer access from the virus trap computer system to the host computer system is strictly regulated by a strong password protection arrangement under the control of a password controller. The virus trap computer system also comprises a restoration controller that is capable of completely erasing and restoring the data and operating system of the virus trap computer system. When the virus trap computer system detects a computer virus or an unauthorized access, the restoration controller of the virus trap computer system erases all data within the elements of the virus trap computer system (e.g., central processing unit, memory, mass storage device). This step completely destroys all traces and effects of the computer virus or the unauthorized access. The restoration controller then downloads a clean version of the data and operating system to the virus trap computer system. This restores the virus trap computer system to the condition that existed before the virus or unauthorized access occurred. Alternatively, a clean version of the data and operating system may be downloaded from the host computer system.

In this manner the virus trap computer system operates as a "sacrificial" computer for the host computer system. The virus trap computer system "sacrifices" itself by receiving the computer virus or unauthorized access that would otherwise have reached the host computer system. The "sacrifice" is not permanent because the virus trap computer system may be completely restored as described above.

It is an object of the present invention to provide an apparatus and method that will receive all external computer communications that may contain computer viruses and unauthorized access attempts before the computer viruses and unauthorized access attempts reach a protected host computer system.

It is also an object of the present invention to provide an apparatus and method that will completely erase the data and the operating system of a virus trap computer system when a computer virus or unauthorized access is detected.

It is another object of the present invention to provide an apparatus and method that will restore a clean version of the data and the operating system of a virus trap computer system after a corrupted version of the data and the operating system has been erased.

It is yet another object of the present invention to provide and apparatus and method for switching computer operations from a host computer system to a virus trap computer system.

It is also another object of the present invention to provide and apparatus and method for switching computer operations from a virus trap computer system to a host computer system.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document and those of ordinary skill in the art should understand that in many, if not most, instances such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which:

FIG. 2 illustrates a high level flow diagram showing a first portion of an advantageous embodiment of the method of the present invention;

FIG. 3 illustrates a high level flow diagram showing a second portion of an advantageous embodiment of the method of the present invention; and FIG. 4 illustrates a high level flow diagram showing a third portion of an advantageous embodiment of the method of the present invention.

DETAILED DESCRIPTION OF THE INVENTION

FIGS. 1A through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged system for protecting a computer system.

Figure 1A:
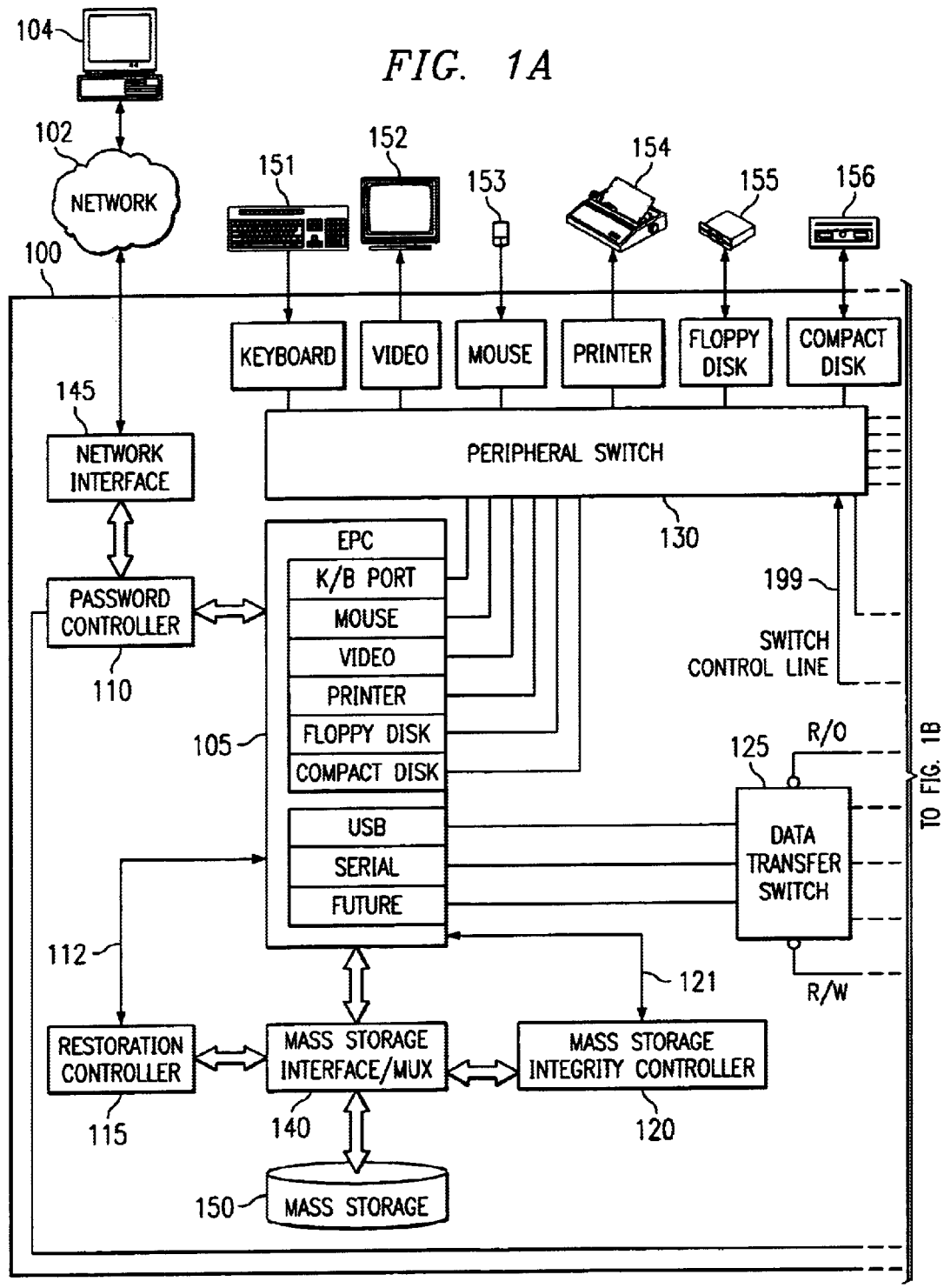
FIGS. 1A and 1B illustrate a high level block diagram of an advantageous embodiment of the present invention for protecting a host computer system from computer viruses and unauthorized access.
Figure 1B:
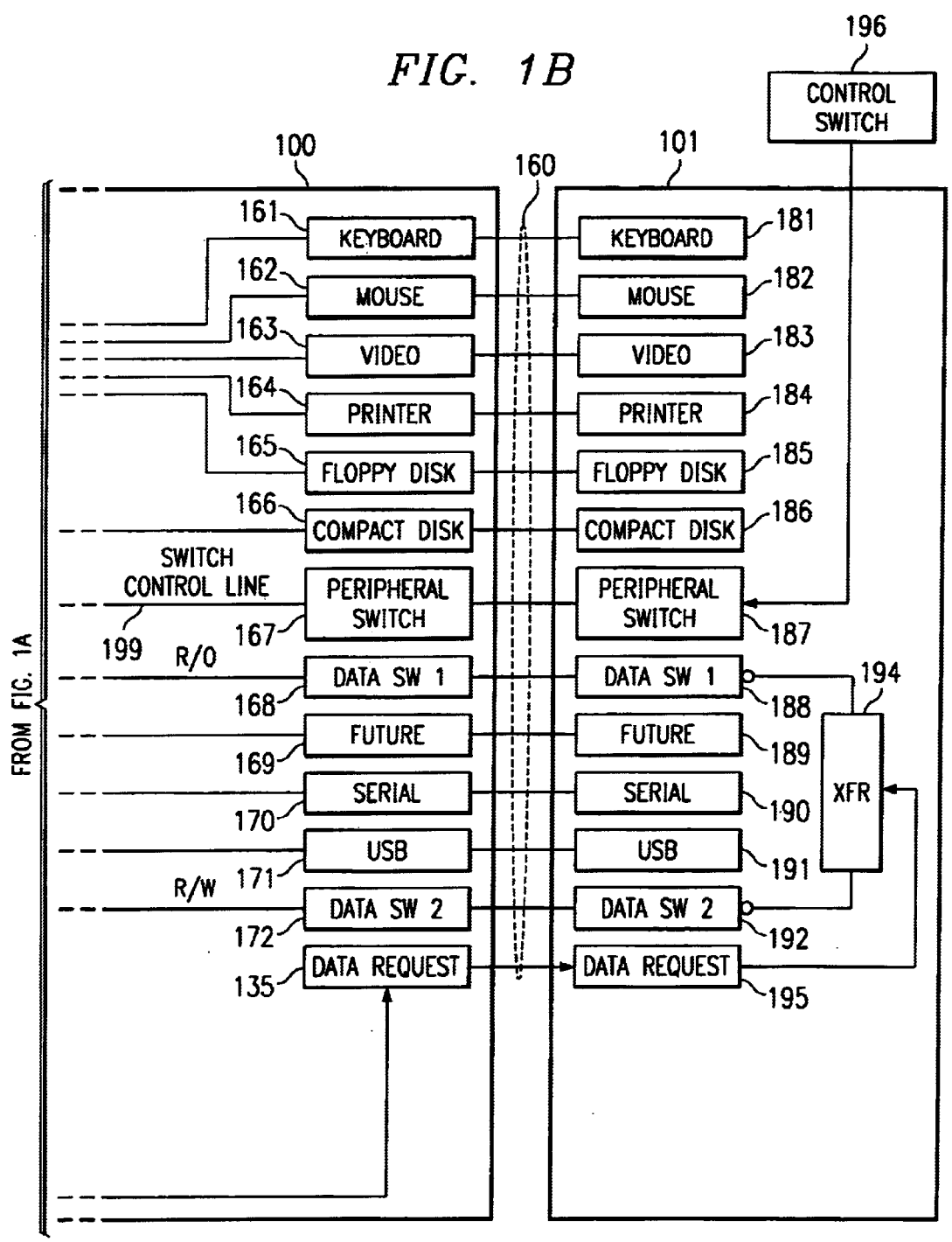

FIGS. 1A and 1B illustrate a high level block diagram of an advantageous embodiment of the present invention for protecting a host computer system from computer viruses and unauthorized access. In the following description, the host computer system that is to be protected is host personal computer 101. For convenience, host personal computer 101 will sometimes be referred to as HPC 101. It is understood that the present invention is not limited to use with personal computers but may be generally used to protect any and all types of computer systems.

Apparatus 100 of the present invention is coupled to host personal computer 101 in a manner that ensures that all computer access to host personal computer 101 must pass through apparatus 100. Apparatus 100 will be referred to as virus trap computer system 100. For convenience, virus trap computer system 100 will sometimes be referred to as VTS 100. As will be more fully described, VTS 100 protects HPC 101 from all types of computer viruses, computer attacks, and attempts to gain unauthorized access to HPC 101.

VTS 100 comprises embedded personal computer (EPC) 105, password controller 110, restoration controller 115, mass storage integrity controller 120, data transfer switch 125, peripheral switch 130, data request port 135, mass storage device interface/multiplexer 140, network interface 145, mass storage device 150. VTS 100 also comprises keyboard port 161, mouse device port 162, video port 163, printer port 164, floppy disk port 165, compact disk port 166, peripheral switch port 167, first data switch port 168, future port 169, serial port 170, universal serial bus port 171, and second data switch port 172. VTS 100 also comprises data transfer switch control module 194 located within HPC 101. Data transfer switch control module 194 is labelled with the letters "XFR" in FIG. 1B.

As shown in FIG. 1B, HPC 101 comprises ports that are complementary to the above described ports of VTS 100. Specifically, HPC 101 comprises keyboard port 181, mouse device port 182, video port 183, printer port 184, floppy disk port 185, compact disk port 186, peripheral switch port 187, first data switch port 188, future port 189, serial port 190, universal serial bus port 191, second data switch port 192, and data request port 195. These ports may be connected to their counterpart ports in VTS 100 through respective connections 160.

VTS 100 may be implemented as a computer card that is physically installed within HPC 101. Alternatively, VTS 100 may be implemented as a computer card that is physically installed within a peripheral (such as a keyboard) that is connected to HPC 101. In order for VTS 100 to protect HPC 101, VTS 100 must be physically installed so that computer access from an external computer (e.g., online computer 104) must first go through VTS 100 to reach HPC 101.

Embedded personal computer (EPC) 105 of VTS 100 uses the architecture of a regular personal computer (PC) having standard interrupt, memory and I/O capability. EPC 105 is composed of three basic elements: (1) hardware, and (2) BIOS, and (3) an operating system. These three elements are incorporated into EPC 105 using a typical personal computer bus protocol. EPC 105 may comprise a PC chipset (also called a "PC on a chip") such as the MachZ™ series manufactured by ZF Linux, or the Geode™ series manufactured by National Semiconductor Corporation, or the Crusoe™ series manufactured by Transmeta, or the Elan™ series manufactured by Advanced Micro Devices.

Password controller 110 may comprise a micro-controller such as the Mega™ series micro-controller manufactured by Atmel. Password controller 110 comprises a central processing unit (CPU), a non-volatile memory such as flash memory, a random access memory (RAM) and a bus coupling the memories to the CPU. Restoration controller 115 comprises a micro-controller that is similar to password controller 110. However, restoration controller 115 may also comprise an embedded PC or PC chipset similar to that of EPC 105. The only peripheral of restoration controller 115 is mass storage device 150.

The term "mass storage device" includes any mass storage device that is both readable and writable, including without limitation, conventional magnetic disk drives, magnetic tape drives, magnetic tape drives for a video cassette recorder (VCR) or a video tape recorder (VTR), optical disk drives for read/write digital versatile disks (DVD-RW), re-writable CD-ROMs, and the like. Mass storage device 150 in this advantageous embodiment of the invention comprises a stand alone storage device installed in VTS 100. A small, high capacity hard disk drive or a flash memory unit are examples of stand alone storage devices that may be used in VTS 100.

Mass storage unit 150 is accessed through mass storage device interface/multiplexer (MUX) 140. It will become necessary to erase the contents of mass storage device 150 when the contents of mass storage device 150 become contaminated with a computer virus or become contaminated due to an unauthorized access. It will then be necessary to restore an earlier uncontaminated version of the contents of mass storage device 150 from data stored in restoration controller 115 or in HPC 101. Because restoration controller 115 comprises a PC micro-controller with mass storage management software, the task of restoring the uncontaminated contents of mass storage device 150 is greatly simplified.

Mass storage integrity controller 120 comprises a micro-controller similar to that of password controller 110 and restoration controller 115. For convenience, mass storage integrity controller 120 may sometimes be referred to as integrity controller 120. Data transfer switch 125 is a bi-directional switch that is controlled by data transfer switch control module 194. Data transfer switch control module 194 is located within HPC 101. Data transfer switch control module 194 may be implemented in either hardware, software, firmware, or a combination of hardware, software, and firmware.

In one advantageous embodiment, data transfer switch control module 194 comprises a software module that is located within the executable memory of HPC 101. In this embodiment, the software of data transfer switch control module 194 is loaded into HPC 101 when VTS 100 is installed. Data transfer switch control module 194 is capable of turning on first data switch port 188 or second data switch port 192 of HPC 101. When data transfer switch control module 194 activates first data switch port 188, data transfer switch 125 is placed in the "read only" mode in which VTS 100 is able to only read data directly from HPC 101. When data transfer switch control module 194 activates second data switch port 192, then VTS 100 is able to both read data from HPC 101 and to write data to HPC 101. The highest level password is required to activate second data switch port 192.

Like any standard PC, embedded personal computer (EPC) 105 of VTS 100 is capable of reading from and writing to mass storage device 150. EPC 105 is also capable of operating any other peripheral connected to it such as floppy disk drive 155, compact disk (CD) drive 156, etc. In the advantageous embodiment of the invention shown in FIG. 1, EPC 105 shares with HPC 101 keyboard 151, display terminal 152, mouse device 153, printer 154, floppy disk drive 155 and compact disk drive 156. EPC 105 is connected to network 102 though password controller 110 and network interface 145. Password controller 110 and network interface 145 are devices that may be separate from VTS 100. In this advantageous embodiment, however, password controller 110 and network interface 145 are included within VTS 100 for ease in explanation. Network interface 145 may provide a communication connection to a local area network (LAN), to the Internet, to a wide area network (WAN), to a digital subscriber line (DSL) or to a modem. EPC 105 operates all commercially available anti-virus software programs and may be programmed to automatically download anti-virus software program updates and virus signature updates. EPC 105 also comprises sufficient memory (not shown) for storing and executing application programs that are operable by a typical personal computer.

As shown in FIG. 1, if an online computer 104 desires to connect to HPC 101, online computer 104 must first communicate with password controller 110. Password controller 110 receives a data stream from online computer 104 through network 102 and through network interface 145. Online computer 104 can gain access to EPC 105 only by submitting a correct first level password that is approved by password controller 110. This first level password may either be simple or complex depending upon the security requirements of VTS 100. EPC 105 functions as the initial line of defense against unauthorized access to HPC 101. In this capacity, EPC 105 serves as a "buffer" between online computer 104 and HPC 101. That is, EPC 105 is the only target that is physically available to online computer 104 after the first level password has been approved. It is an important feature of the present invention that outside data from online computer 104 is first sent only to EPC 105. This feature insures that online computer 104 remains physically isolated from HPC 101.

A second level password (which may or may not be the same password as the first level password) is needed to request activation of data transfer switch 125. The second level password is sent through data request port 135 of VTS 100 and on to data request port 195 of HPC 101. The second level password may be approved by password controller 110 and/or by data transfer switch control module 194 of HPC 101.

After the second level password has been approved, a data pathway is then opened either in the unidirectional mode or in the bi-directional mode depending upon the security parameters of the password. Upon receiving commands from data transfer switch control module 194, data transfer switch 125 allows either a unidirectional data pathway or a bi-directional data pathway between EPC 105 and HPC 101. The unidirectional mode allows data transfers from HPC 101 to EPC 105 in a "read only" data function. In the unidirectional mode, data can be read from HPC 101 but not written to HPC 101. In contrast, the bi-directional mode allows data transfers between EPC 105 and HPC 101 in a "read/write" data function. In the bi-directional mode, data can be read from HPC 101 and can also be written to HPC 101.

In order to prevent viruses or unauthorized users from accessing HPC 101, data transfer switch 125 is exclusively activated by HPC 101. That is, no outside software can be executed on EPC 105 that will cause data transfer switch 125 to activate either the unidirectional mode or the bi-directional mode. This means that online computer 104 will not be able to cause EPC 105 to allow data to be read from or written to HPC 101. This feature eliminates any possibility that HPC 101 can be accessed in an unauthorized manner.

When VTS 100 is powered up, the data paths of transfer switch 125 are, by default, broken (i.e., open) for both the unidirectional mode and the bi-directional mode. VTS 100 and/or data transfer switch control module 194 are capable of breaking any active data paths after a predetermined time of inactivity. When data transfer switch 125 is selected for unidirectional data transfers, the "read only" mode only permits data to travel from HPC 101 to EPC 105 (e.g., through serial port 190, serial port 170, and data transfer switch 125). This one way mode of data transfer effectively isolates HPC 101 and its files from corruption by data from online computer 104.

When data transfer switch 125 is selected for bi-directional data transfers, the "read/write" mode permits data to travel in both directions to and from EPC 105 and HPC 101. Data can pass freely to and from future port 189 and future port 169, to and from serial port 190 and serial port 170, and to and from universal serial bus port 191 and universal serial bus port 171. This two way mode of data transfer exposes HPC 101 and its files to potential corruption by data from online computer 104. Therefore, the operator of HPC 101 should exercise extreme caution when using the bi-directional mode of data transfer. The bi-directional mode of transfer should be de-activated when it is not actually being used. Furthermore, the operator should be reasonably certain that any files to be transferred to HPC 101 are virus free. Whether a program contains a computer virus can be ascertained by running commercially available virus detection programs on EPC 105. If a file is questionable, EPC 105 should be used as the primary computer for processing the questionable file.

Peripheral switch 130 allows HPC 101 to switch any combination of peripherals to EPC 105. EPC 105 has no control over peripheral switch 130. However, on HPC 101 there exists a local mechanism (i.e., not accessible by online users) for transferring control of any peripheral back to HPC 101. The local mechanism is hardware based control switch 196. Control switch 196 is coupled to peripheral switch port 187 and is capable of transferring any desired peripheral back to HPC 101. A hardware based switch is chosen for this function because a hardware based switch does not involve internal VTS 100 support software that could possibly be compromised by hackers or viruses. A software based switch (e.g., a "hot key" on the keyboard) would provide a "back door" entry point to HPC 101 because (1) the switching process would necessarily utilize software drivers, and (2) the software drivers would be susceptible to tampering by hackers and corruption by viruses.

As previously mentioned, HPC 101 may switch any combination of peripherals to EPC 105. For example, HPC 101 may be printing a print job on printer 154 while EPC 105 is using keyboard 151, mouse device 153 and display terminal 152 to access the Internet (network 102). HPC 101 operates peripheral switch 130 through peripheral switch port 187 on HPC 101, and through peripheral switch port 167 on VTS 100, and through switch control line 199 on VTS 100.

HPC 101 is capable of accessing mass storage device 150 only indirectly because the commands that operate mass storage device interface/multiplexer 140 are only sent through EPC 105. Mass storage device interface/multiplexer 140 is a three way multiplexer switch. It enables EPC 105 to allow restoration controller 115 and integrity controller 120 to individually access mass storage device 150. At any given time, mass storage device 150 may be under the control of EPC 105, integrity controller 120, or restoration controller 115.

Integrity controller 120 monitors the data and applications (including the EPC 105 operating system) that are stored on mass storage device 150. Integrity controller 120 is capable of detecting unauthorized reads and writes to mass storage device 150. If an unauthorized read or write is detected, integrity controller 120 sends an alert signal to EPC 105 through non-maskable interrupt line 121. As is well known in the art, a non-maskable interrupt is the highest priority interrupt. No matter what the execution state of EPC 105 is, the non-maskable interrupt on line 121 is handled when it is received by non-volatile firmware and hardware located within EPC 105. If an interrupt is sent to EPC 105 via non-maskable interrupt line 121, EPC 105 notifies the user that the integrity of mass storage device 150 has been compromised by an unauthorized read or write. At the user's discretion, (1) the user may continue operating, or (2) the user may cause a complete restoration of VTS 100 to be performed.

Upon receiving a user request for restoration of VTS 100, EPC 105 switches control of mass storage device 150 to restoration controller 115. In some circumstances, the degradation of data in mass storage device 150 may be so significant that EPC 105 automatically requests restoration of VTS 100 without the user's intervention. For example, if EPC 105 cannot successfully boot itself up in the EPC 105 operating system, then the restoration of VTS 100 would automatically begin. In all cases of restoration, restoration controller 115 restores VTS 100 to its original state. All data that previously existed in VTS 100 is erased. All data contained in EPC 105 is erased and replaced with an uncorrupted version of the erased data from restoration controller 115 or (at the user's discretion) from HPC 101. HPC 101 is not affected by any of the restoration operations on VTS 100. In fact, the user may switch from VTS 100 to HPC 101 while VTS 100 is being restored.

The restoration procedure may be considered to be a radical step to take in response to the detection of an unauthorized access of mass storage device 150. The detection of an unauthorized access may be immediately presented to the user in a warning message on display terminal 152. The warning message may give the user an option to apply virus cleansing applications (using EPC 105) to the data stored on mass storage device 150. If the virus cleansing applications are determined to be successful, then integrity controller 120 continues to monitor mass storage device 150. However, if the virus cleansing applications are determined to be unsuccessful, then the user may direct restoration controller 115 to completely erase all data on mass storage device 150. As previously mentioned, after all of the data has been erased in mass storage device 150 (e.g., by reformatting the hard disk), replacement data is loaded onto mass storage device 150 from restoration controller 115 or (at the user's discretion) from HPC 101. If a predetermined period of time passes after the warning message without a response from the user (e.g., the user is absent and the computer is unattended), then EPC 105 may automatically activate restoration controller 115 and conduct the restoration process to restore the data on mass storage device 150.

When EPC 105 activates restoration controller 115, restoration controller 115 may perform a high level restoration (erasing only the data address tables) or a low level restoration (erasing all the data). If restoration controller 115 erases all data in a low level restoration, then restoration controller 115 copies an image of the original operating system of EPC 105 back onto mass storage device 150 from the non-volatile memory of restoration controller 115.

In this manner the user may restore a copy of the VTS 100 operating system from the non-volatile memory of restoration controller 115. Alternatively, the user may completely restore the VTS 100 operating system from a compact disk within compact disk drive 156. When the user reboots VTS 100, the new operating system displays on display terminal 152 and VTS 100 again becomes a fully functional computer. As soon as the restoration process is complete, an image of the operating system of VTS 100 is stored on restoration controller 115 and is available for writing to mass storage device 150.

The initial installation of VTS 100 requires that VTS 100 be connected to HPC 101. The connection of peripheral lines, data lines, and control lines between VTS 100 and HPC 101 is indicated in FIG. 1 with reference numeral 160. When VTS 100 is powered up, VTS 100 may be pre-loaded with an onboard operating system (such as a Windows™ operating system). The user may install the EPC 105 operating system by downloading HPC 101 operating system files utilizing data transfer switch 125. The user may also install the EPC 105 operating system from floppy disks, from compact disks (CD), or from other computer media (not shown) that contain operating system programs and applications.

There are two scenarios for loading the EPC 105 operating system. The first scenario involves a "factory loaded" operating system. A computer operating system is usually pre-installed at the factory so that the operating system is ready for operation when the computer is first powered up. In an advantageous embodiment of the present invention, EPC 105 is pre-loaded with a factory installed operating system. An identical image copy of the EPC 105 operating system is also factory installed in the non-volatile memory (not shown) of restoration controller 115. Because the contents of the non-volatile memory of restoration controller 115 can not be corrupted under normal circumstances, restoration controller 115 is able to subsequently restore the EPC 105 operating system (and VTS 100) to its original factory configuration.

The second scenario for loading the EPC 105 operating system involves a change to the factory installed operating system (e.g., an operating systems upgrade). To change the EPC 105 operating system, the user switches compact disk drive 156 from HPC 101 to EPC 105. The new operating system is then installed on EPC 105 in the normal fashion from a compact disk in compact disk drive 156 (or from another type of computer media such as floppy disks in floppy disk drive 155). The new operating system then resides on EPC 105 and mass storage device 150. After the new operating system has been successfully loaded, VTS 100 is able to boot up the new operating system.

As soon as the installation of the new operating system is complete, an image of the new operating system is copied from mass storage 150 to the non-volatile memory of restoration controller 115 in the following manner. Using communication line 112, EPC 105 informs restoration controller 115 that control of mass storage 150 is going to be switched to restoration controller 115 through mass storage interface/multiplexer 140. Mass storage interface/multiplexer 140 comprises circuitry that performs a seamless transfer of control of mass storage 150 between EPC 105, restoration controller 115, and integrity controller 120.

After restoration controller 115 receives control over mass storage 150, restoration controller 115 reads the contents of mass storage 150. After restoration controller 115 completely reads the contents of mass storage 150, then restoration controller 115 copies an image of the data and the operating system into the non-volatile memory of restoration controller 115. Restoration controller 115 then returns control of mass storage 150 to EPC 105 through mass storage interface/multiplexer 140. EPC 105 then resumes the normal operation of a personal computer.

As previously mentioned, when it is discovered that the data or operating system in EPC 105 or in mass storage 150 has been compromised, the user has three options for restoring the data and operating system of VTS 100 after the compromised data and operating system have been erased. The first option is to have a copy of the previously stored image of the data and operating system transferred from restoration controller 115 to EPC 105 and mass storage 150. The second option is to have a copy of the previously stored image of the data and operating system transferred from HPC 101 to EPC 105 and mass storage 150. The third option is to have a new EPC 105 operating system installed from a compact disk in compact disk drive 156 (or from another type of computer media such as floppy disks in floppy disk drive 155). The data may be restored from an offline backup data source (e.g., disk or tape backup storage).

In the event that the EPC 105 operating system deteriorates to the point that EPC 105 is not able to boot up the operating system, then control of mass storage 150 is automatically transferred to restoration controller 115. This transfer of control is accomplished using EPC 105 non-volatile firmware instructions (not shown) and using communications line 112. The non-volatile firmware instructions of EPC 105 are not susceptible to being altered by viruses or unauthorized access (e.g., hacker attacks). The non-volatile firmware memory of EPC 105 contains firmware instructions that provide the intelligence necessary to restore the EPC 105 operating system to its original state. The non-volatile firmware instructions of EPC 105 make the decision to transfer control of mass storage 150 to restoration controller 115 so that restoration controller can completely restore the EPC 105 operating system. After the EPC 105 operating system has been completely restored, EPC 105 takes control of mass storage 150.

When virus detection software in EPC 105 finds a virus or other similar problem, one of the user's options is to cause restoration controller 115 to initiate a complete restoration of the EPC 105 operating system. Where integrity controller 120 finds a problem during the execution of diagnostics for mass storage 150, integrity controller 120 sends a request to EPC 105 through non-maskable interrupt line 121 to cause EPC 105 to request a complete restoration of the EPC 105 operating system.

Integrity controller 120 monitors mass storage 150 for corruption of data content. Data integrity may be checked by a number of different methods. A first data integrity check method is performed when EPC 105 is idle and mass storage 150 is not being used. To perform the first data integrity check method, control of mass storage 150 is switched to integrity controller 120 using mass storage interface/multiplexer 140. Integrity controller 120 then performs Cyclic Redundancy Checks ("CRC") on the entire contents of mass storage 150. A Cyclic Redundancy Check is a running summation of all byte values contained within mass storage 150. The summing process yields a unique numerical value that will be compared to subsequent calculated CRC values. During the idle time of EPC 105, no data on mass storage 150 should be altered by unauthorized data writes (e.g., data writes from a virus). If the CRC values differ, then integrity controller 120 alerts EPC 105. The user then receives a warning from VTS 100 that a possible data corruption has occurred. If the CRC values do not differ, then no warning is sent. At the end of the EPC 105 idle time, EPC 105 automatically regains control of mass storage 150 through mass storage interface/multiplexer 140 and resumes normal operation.

A second data integrity check method involves monitoring reads and writes in mass storage 150 that are not initiated by the user's application programs. When a read violation or a write violation is detected, the user also receives a warning from VTS 100.

These two data integrity check methods are illustrative. Other types of methods exist for checking the integrity of data on mass storage 150. The memory size of integrity controller 120 enables it to store and execute other additional data integrity checking algorithms.

FIG. 2 illustrates a high level flow diagram showing a first portion of an advantageous embodiment of the method of the present invention. The steps of the method are collectively referred to with reference numeral 200. HPC 101 is powered up and an HPC 101 operating system (e.g., Microsoft Windows™) is booted up (process step 210). HPC 101 is then in control of all of the peripherals through switch control line 199 and peripheral switch 130. An HPC 101 operating system startup file causes an icon for VTS 100 to be displayed on display terminal 152 (process step 220). HPC 101 operates as the primary computer (process step 230). VTS 100 is inactive.

In order for HPC 101 to go online through network interface 145, the user may activate VTS 100 by clicking the VTS icon with mouse device 153. (Alternatively, VTS 100 may be activated using other well known methods.) The program waits for the user to activate VTS 100 by selecting the VTS icon (decision step 240). If the user does not select the VTS icon, the program continues with HPC 101 as the primary computer (process step 230). If the user does select the VTS icon, then the VTS 100 operating system boots up (process step 250) so that VTS 100 can take over the role of the primary computer from HPC 101. The activation of VTS 100 also causes the control of display terminal 152 and any other selected peripherals to be switched over to VTS 100 (process step 260). To accomplish the transfer of control, HPC 101 sends a control signal to peripheral switch 130 through switch control line 199 to cause the control and data interface of the peripherals to be transferred from HPC 101 to EPC 105. The VTS 100 screen display then appears on display terminal 152.

VTS 100 then operates as the primary computer (process step 270). While VTS 100 is operating as the primary computer, HPC 101 may operate in the background. In order for the user to cause HPC 101 to again operate as the primary computer, the user must activate HPC 101 with control switch 196 that is located on HPC 101. The program waits for the user to activate HPC 101 by activating control switch 196 (process step 280). If the user does not activate control switch 196, the program continues with VTS 100 as the primary computer (process step 270).

If the user does activate control switch 196, then the control of the peripherals is returned to HPC 101 (decision step 290). Specifically, control of any selected peripherals (including keyboard 151, display terminal 152, mouse device 153, printer 154, floppy disk drive 155 and compact disk drive 156) is switched from VTS 100 to HPC 101. In response to the activation of control switch 196, HPC 101 sends a control signal through switch control line 199 to peripheral switch 130 to cause control of the peripherals to be switched back to itself (i.e., back to HPC 101).

No way exists in which VTS 100 can physically activate peripheral switch 130. Only HPC 101 is capable of controlling peripheral switch 130 through switch control line 199. The switching arrangement of the present invention allows HPC 101 to continue and complete a print job on printer 154 even though control of the other peripherals has already been transferred to VTS 100. Similarly, VTS 100 is also allowed to continue and complete a print job on printer 154 even though control of the other peripherals has already been transferred to HPC 101.

HPC 101 then operates as the primary computer (process step 230). VTS 100 becomes inactive. As before, HPC 101 displays a VTS icon on the display screen of display monitor 152. VTS 100 remains inactive until the user again activates VTS 100 by selecting the VTS icon.

FIG. 3 illustrates a high level flow diagram showing a second portion of an advantageous embodiment of the method of the present invention. The steps of the method are collectively referred to with reference numeral 300. This portion of the method begins after HPC 101 has booted up the operating system of VTS 100 (process step 250) and has passed control of the peripherals to VTS 100 (process step 260). This portion of the method occurs when VTS 100 is operating as the primary computer and most, if not all, of the computer operations are being performed by VTS 100 (process step 270). The VTS 100 display screen on display terminal 152 (shown in FIG. 1) displays various icons. One of the icons that is displayed is an Internet icon for connecting VTS 100 to the Internet. The program waits for the Internet icon to be selected (decision step 310). If the user does not select the Internet icon, then VTS 100 continues its normal operations (process step 270). If the user selects the Internet icon, then VTS 100 accesses the Internet through network interface 145 (shown in FIG. 1) and downloads computer files (e.g., e-mail) into VTS 100 (process step 320). VTS 100 then continues its normal operations (process step 330).

VTS 100 monitors incoming computer data for intrusions (decision step 340). The term "intrusion" refers to the presence of a computer virus or an unauthorized access. If no intrusions are detected, VTS 100 continues its normal operation (process step 330). If an intrusion is detected, a determination is made whether the intrusion is a virus or an unauthorized access (e.g., a hacker attack) (decision step 350). If it is determined that the intrusion is not a virus, it is assumed that the intrusion is an unauthorized access. VTS 100 then immediately activates restoration controller 115 to reformat mass storage 150 and replace the data and the VTS 110 operating system (process step 360). Any data from the unauthorized access is erased along with the old version of the data and the VTS 100 operating system. VTS 100 then breaks the connection to the Internet (process step 370) and continues normal operations (process step 270). Newly restored VTS 100 operates as the primary computer but the connection to the Internet has been broken. Connection to the Internet may be established by selecting the Internet icon on the VTS 100 display screen.

If it is determined that the intrusion is a virus, the resident virus detection programs residing on VTS 100 may be instructed to attempt to clean the virus from VTS 100 (decision step 380). That is, VTS 100 may be programmed to attempt to clean the virus with virus detection programs rather that immediately replacing the data and the VTS 100 operating system using restoration controller 115.

When VTS 100 detects a virus, then VTS 100 sends the user a warning message on the display screen of display monitor 152 stating that a virus has been detected. The warning message gives the user the options of (1) immediately replacing the data and operating system in VTS 100 using restoration controller 115, or (2) attempting to clean the detected virus from VTS 100. If the user decides to replace the virus infected data in VTS 100 with a clean copy of the data and operating system of VTS 100, then the user activates restoration controller 115. Restoration controller 115 causes all the data in EPC 105 and all the data in mass storage device 150 to be erased. This insures that the virus data is also erased. Data in mass storage device 150 is completely erased by reformatting mass storage device 150. Restoration controller 115 then restores to VTS 100 the original data and the original VTS 100 operating system from an image stored on restoration controller 115 or on HPC 101 (process step 360). The virus corrupted data is erased along with the old version of the data and operating system of VTS 100.

VTS 100 then breaks the connection to the Internet (process step 370) and continues normal operations (process step 270). Newly restored VTS 100 operates as the primary computer but the connection to the Internet has been broken. As before, connection to the Internet may be established by selecting the Internet icon on the VTS 100 display screen.

The user may decide to allow the virus detection programs to attempt to clean the detected virus from VTS 100. The user then sends such a command to VTS 100 and the virus detection programs operate to clean the detected virus. After the virus detection programs have attempted to clean the virus, a determination is made whether the virus was successfully cleaned (i.e., whether VTS 100 is operating correctly) (decision step 390). If VTS 100 is operating correctly, then VTS 100 continues normal operation (process step 330). If VTS 100 is not operating correctly, then VTS 100 automatically activates restoration controller 115 to replace the data and operating system of VTS 100 as previously described (process step 360). Control then passes to process step 370 and process step 270 as previously described.

In an alternate advantageous embodiment of the method of the present invention, VTS 100 may be programmed to automatically activate restoration controller 115 whenever a virus is detected. In this embodiment, there is no need for a user to be present to make a decision whether to attempt to clean the virus. VTS 100 automatically removes any detected virus by installing a clean version of the data and a clean version of the VTS 100 operating system either from restoration controller 115 or from HPC 101.

In another alternate advantageous embodiment of the method of the present invention, VTS 100 may be programmed to activate restoration controller 115 only when directly authorized to do so by a user instruction. In this embodiment, a user must be present and must make the decision to activate restoration controller 115 to replace the data and operating system of VTS 100.

HPC 101 has no direct connection to the Internet. In fact, the Internet icon is not available on the HPC 101 display screen. HPC 101 only communicates with VTS 100 through data transfer switch 125. HPC 101 freely sends communications to VTS 100. However, VTS 100 can only send communications to HPC 101 when a high level password (e.g., from online computer 104) has been presented to and accepted by HPC 101. In either case, data paths are established only through data switch 125 for data transfers between HPC 101 and VTS 100. VTS 100 has an exclusive hardware connection to the Internet through network interface 145. That is, it is physically impossible for HPC 101 to connect directly to the Internet. HPC 101 can only access the Internet through VTS 100.

In addition, VTS 100 cannot establish a data path to HPC 101 unless HPC 101 allows a bi-directional data path to be established between HPC 101 and VTS 100. During the normal operation of VTS 100, the data path between HPC 101 and VTS 100 is a unidirectional data path in which data passes only from HPC 101 to VTS 100, but not from VTS 100 to HPC 101. The length of time that the unidirectional data path is open between HPC 101 and VTS 100 is usually very short. That is, the unidirectional data path is not allowed to remain open but is closed as soon as a particular data transfer is complete. Because there is normally no data path from VTS 100 to HPC 100, a virus or a hacker that has gained access to VTS 100 cannot reach HPC 101 because access to HPC 101 is not enabled. As soon as the presence of the virus or the hacker is detected in VTS 100, the entire data and operating system of VTS 100 may be erased and replaced.

FIG. 4 illustrates a high level flow diagram showing a third portion of an advantageous embodiment of the method of the present invention. The steps of the method are collectively referred to with reference numeral 400. This portion of the method occurs after HPC 101 has caused VTS 100 to be booted up and to assume operational control. VTS 100 is then operating as the primary computer (process step 270 in FIG. 3). This portion of the method also occurs after VTS 100 has already accessed an external network which in this example is the Internet (process step 320 in FIG. 3). At this point VTS 100 is continuing its normal operation (process step 330).

From this point forward, all outside communication and user interaction with HPC 101 takes place through VTS 100. VTS 100 displays desktop graphics and various icons on the screen of display monitor 152. VTS 100 utilizes password controller 110 to monitor the incoming data from the Internet to inspect the data for password characters (process step 410). Password controller 110 searches for specific characters that represent (1) a password, (2) an indicator that a password attempt will immediately follow the indicator, and (3) a password that immediately follows a password indicator. Password controller 110 can utilize many different types of password arrangements.

EPC 105 makes a determination whether password controller 110 has identified and accepted a first level password (decision step 420). If a first level password attempt is received but is not accepted, control returns to process step 410. If a first level password attempt is received and is accepted as being a correct first level password, then password controller 110 continues to monitor the incoming data stream for a possible second level password attempt to access HPC 101 (decision step 430).

EPC 105 then makes a determination whether password controller 110 has identified and accepted a second level password attempt to access HPC 101 (decision step 430). If a second level password attempt is received but is not accepted, then only the VTS files in VTS 100 may be accessed (process step 440). Control then returns to process step 330 where VTS 100 continues normal operation.

If the second level password attempt to access HPC 101 is received and is accepted (decision step 430), access is then granted to HPC 101 for a final determination by data transfer switch control module 194 whether the second level HPC 101 password is a valid password (decision step 450). The second level HPC 101 password requests either a bi-directional data pathway or a unidirectional data pathway between HPC 101 and EPC 105. Embedded in the second level HPC 101 password are certain parameters that communicate to HPC 101 which of the two data pathways ("read only" or "read/write") are being requested by password controller 110. If the second level HPC 101 password is accepted by data transfer switch control module 194, then HPC 101 activates the requested data switch (either data switch 188 for "read only" or data switch 192 for "read/write"). Data switch 188 activates the corresponding data switch 168 in VTS 100 to activate data transfer switch 125 in the "read only" mode. Similarly, data switch 192 activates the corresponding data switch 172 in VTS 100 to activate data transfer switch 125 in the "read/write" mode. This causes VTS 100 to have access to the appropriate HPC 101 files (process step 460).

If the second level HPC 101 password is not accepted as valid by data transfer switch control module 194, then only the VTS files in VTS 100 may be accessed (process step 440). Control then returns to process step 330 where VTS 100 continues normal operation.

The password access arrangement may be summarized as follows. If the first level password is accepted, then the user only gains access to VTS 100. If the second level password is not accepted, then access to HPC 101 is denied but access to VTS 100 remains authorized (process step 440). The user can then continue normal operations in VTS 100 (process step 330). If the second level password is accepted, then access to the appropriate files of HPC 101 is allowed (process step 460).

Generally, the only files that may be transferred to HPC 101 are files that have been checked by the virus detection programs in VTS 100 and approved for transfer to HPC 101 by the holder of the highest level password. However, it must be noted that access to HPC 101 permits complete control over VTS 100 and the file transfer functions that transfer files between VTS 100 and HPC 101. After the user has accessed HPC 101, the user then operates through VTS 100 to prevent any virus infected files from being transferred to HPC 101 and to the data stored there (process step 410).

VTS 100 acts as a "sacrificial" computer to HPC 101. VTS 100 is sacrificial in the sense that any incoming virus or unauthorized access that reaches VTS 100 affects only VTS 100, and does not affect HPC 101. VTS 100 is a fully functional computer with its own mass storage device 150 and a complete operating system. If VTS 100 becomes infected by a virus or an unauthorized access, it is extremely unlikely that the virus or unauthorized access will infect HPC 101 due to the strict requirements that must be met to access HPC 101. If and when VTS 100 is infected by a virus or an unauthorized access, the present invention is capable of completely removing any trace of the virus or the unauthorized access. This is done by reformatting mass storage device 150, erasing the entire data and operating system of VTS 100, and replacing the entire data and operating system of VTS 100. Therefore, even if VTS 100 becomes infected, it is easy to prevent the virus or unauthorized access from reaching HPC 101 because VTS 100 can immediately renew itself and destroy the software portions of the virus or the unauthorized access.

It is important to note that while the present invention has been described in the context of a fully functional computer system, those skilled in the art will appreciate that the apparatus and methods of the present invention are capable of being practiced using computer software instructions recorded on a variety of different types of computer readable media. It is also important to note that the principles and methods of the present invention are used, regardless of the particular type of computer readable media utilized to perform the principles and methods of the invention. Examples of computer readable media include: nonvolatile, hard-coded type media such as read only memories (ROMs) or erasable, electrically programmable read only memories (EEPROMs), recordable type media such as floppy disks, hard disk drives, solid state drives and CD-ROMs, and transmission type media such as digital and analog communication links.

It is also important to note that although the elements of the present invention have been described as individual units, it is possible to implement the elements of the present invention on one integrated circuit chip. For example, embedded personal computer 105, peripheral switch 130, restoration controller 115, data transfer switch 125, mass storage integrity controller 120, and mass storage interface/multiplexer 140 may all be implemented on one integrated circuit chip. Password controller 110 may also be implemented with other elements of the present invention on one integrated circuit chip.

Although the present invention has been described in detail, those skilled in the art should understand that they can make various changes, substitutions and alterations herein without departing from the spirit and scope of the invention in its broadest form.

What is claimed is:

1. A virus trap computer system for protecting a host computer system from an intrusion such as a computer virus or an unauthorized access, said virus trap computer system comprising:

an embedded personal computer coupled to the host computer system, said embedded personal computer receiving all external computer communications that are directed to the host computer system;

means for monitoring the external computer communications and detecting whether the intrusion is present in the external computer communications; and a password controller coupled to the embedded personal computer and a network interface, said password controller receiving an external communication from the network interface, identifying a password in the external communication, and in response to receiving a valid password, allowing the external communication access to the embedded personal computer.

2. The virus trap computer system as set forth in claim 1 wherein the virus trap computer system is capable of deleting the intrusion by erasing data within the virus trap computer system.

3. The virus trap computer system as set forth in claim 2 wherein the data erased by the virus trap computer system comprises one of:

a computer virus software program, an operating system of the virus trap computer system, and at least one computer software program within the virus trap computer system.

4. The virus trap computer system as set forth in claim 2 wherein after the virus trap computer system has deleted the intrusion by erasing data within the virus trap computer system, the virus trap computer system is capable of receiving a clean version of data that existed in the virus trap computer system before the intrusion occurred.

5. The virus trap computer system as set forth in claim 4 further comprising a restoration controller for supplying to the virus trap computer system, the clean version of the data after the virus trap computer system has deleted the intrusion by erasing data within the virus trap computer system.

6. The virus trap computer system as set forth in claim 4 wherein the virus trap computer system receives the clean version of the data from one of: (1) the host computer system, and (2) an external backup copy of the clean version of the data.

7. The virus trap computer system as set forth in claim 1 further comprising a peripheral switch that switches control of at least one computer peripheral from the virus trap computer system to the host computer system and from the host computer system to the virus trap computer system.

8. The virus trap computer system as set forth in claim 7 further comprising a control switch coupled to the host computer system, said control switch capable of causing the peripheral switch of the virus trap computer system to switch control of said at least one computer peripheral from the virus trap computer system to the host computer system.

9. The virus trap computer system as set forth in claim 1 further comprising:

a data transfer switch coupled to the embedded personal computer and to the host computer system;

wherein the data transfer switch transfers data from the host computer system to the embedded personal computer when the data transfer switch is set in read only mode; and wherein the data transfer switch transfers data from the embedded personal computer to the host computer system and from the host computer system to the embedded personal computer when the data transfer switch is set in read and write mode.

10. The virus trap computer system as set forth in claim 9 wherein the data transfer switch is exclusively controlled by the host computer system.

11. The virus trap computer system as set forth in claim 1 further comprising:

a mass storage device coupled to the embedded personal computer; and a restoration controller coupled to the embedded personal computer and to the mass storage device, restoration controller for (1) causing all data on the embedded personal computer and the mass storage device to be erased, and (2) after the data has been erased, supplying a clean version of the erased data to the embedded personal computer and to the mass storage device.

12. The virus trap computer system as set forth in claim 11 further comprising:

a mass storage integrity controller coupled to the embedded personal computer and to the mass storage device, said mass storage integrity controller for detecting an intrusion on the mass storage device, and requesting the embedded personal computer to cause the restoration controller to cause all data on the mass storage device to be erased.

13. The virus trap computer system as set forth in claim 1 wherein the password controller is coupled to the host computer system, and wherein the host computer system, in response to receiving a valid second level password from the password controller, allows the external communication access to the host computer system through the embedded personal computer and through a data transfer switch.

14. A virus trap computer system for protecting a host computer system from an intrusion such as a computer virus or an unauthorized access, said virus trap computer system comprising:

an embedded personal computer coupled to the host computer system, said embedded personal computer receiving all external computer communications that are directed to the host computer system, and detecting an intrusion before the intrusion reaches the host computer system;

a mass storage device coupled to the embedded personal computer;

a mass storage integrity controller coupled to the embedded personal computer and to the mass storage device, said mass storage integrity controller detecting an intrusion on the mass storage device;

a restoration controller coupled to the embedded personal computer and to the mass storage device, said restoration controller deleting the intrusion by erasing data within the embedded personal computer and within the mass storage device, said restoration controller thereafter supplying a clean version of the erased data to the embedded personal computer and to the mass storage device; and a password controller coupled to the embedded personal computer and to a network interface, said password controller receiving a computer communication from the network interface, identifying a password in the computer communication, and in response to receiving a valid password, allowing the external computer communication access to one of: the embedded personal computer and the host computer system.

15. The virus trap computer system as set forth in claim 14 wherein the embedded personal computer, the restoration controller, and the mass storage integrity controller are implemented on one integrated circuit chip.

16. The virus trap computer system as set forth in claim 14 wherein the embedded personal computer, the restoration controller, the mass storage integrity controller, and the password controller are implemented on one integrated circuit chip.

17. A method of protecting a host computer system from an intrusion such as a computer virus or an unauthorized access, method comprising:

coupling a virus trap computer system to the host computer system, said virus trap computer system comprising an embedded personal computer coupled to the host computer through a data transfer switch;

coupling a password controller to the embedded personal computer and to a network interface;

receiving a computer communication in the password controller from the network interface, said computer communication being directed to the host computer system;

identifying a password in the computer communication;

in response to receiving a valid password, sending the external computer communication to the embedded personal computer for transfer to the host computer system; and detecting the intrusion by the embedded personal computer before the intrusion reaches the host computer system.

18. The method as set forth in claim 17 further comprising the step of:

deleting the intrusion by erasing data within the virus trap computer system.

19. The method as set forth in claim 18 wherein the data erased by the virus trap computer system comprises one of: a computer virus software program, an operating system of the virus trap computer system, and at least one computer software program within the virus trap computer system.

20. The method as set forth in claim 18 further comprising the step of:

after the step of deleting the intrusion, receiving in the virus trap computer system, a clean version of data that existed in the virus trap computer system before the intrusion occurred.

21. The method as set forth in claim 20 wherein the clean version of the data is provided by one of: a restoration controller in the virus trap computer system, the host computer system, and an external backup copy of the clean version of the data.

22. The method as set forth in claim 17 further comprising the steps of:

switching control of at least one computer peripheral between the virus trap computer system and the host computer system according to host computer system requirements utilizing a peripheral switch in the virus trap computer system; and using a control switch coupled to the host computer system to cause the peripheral switch of the virus trap computer to switch control of said at least one computer peripheral from the virus trap computer system to the host computer system.

23. The method as set forth in claim 17 further comprising the steps of:

coupling a data transfer switch to the embedded personal computer and to the host computer system;

transferring data from the host computer system to the embedded personal computer when the data transfer switch is set in read only mode;

transferring data from the embedded personal computer to the host computer system and from the host computer system to the embedded personal computer when the data transfer switch is in read and write mode; and exclusively controlling the data transfer switch with the host computer system.

24. The method as set forth in claim 17 further comprising the steps of:

coupling a mass storage device to the embedded personal computer;

coupling a restoration controller to the embedded personal computer and to the mass storage device;

in response to a signal from the restoration controller, causing all data on the embedded personal computer and on the mass storage device to be erased; and after the date has been erased, transferring a clean version of the erased data to the embedded personal computer and to the mass storage device.

25. The method as set forth in claim 24 further comprising the steps of:

coupling a mass storage integrity controller to the embedded personal computer and to the mass storage device;

detecting an intrusion in the mass storage device with the mass storage integrity controller; and requesting the embedded personal computer to instruct the restoration controller to erase all data on the mass storage device.

26. The method as set forth in claim 17 further comprising the steps of:

coupling the password controller to the host computer system; and in response to receiving a valid second level password in the password controller, allowing the external computer communication access to the host computer system through the embedded personal computer and through the data transfer switch.

27. A virus trap for protecting an associated host computer from a computer virus received from an external source, virus trap comprising:

a mass storage device that stores data and application programs;

an embedded processor that controls the virus trap and runs the application programs;

means for receiving communications from the external source and supplying the communications to the embedded processor;

an integrity controller that monitors the data and application programs to detect unauthorized read or write operations;

a restoration controller, responsive to a detection of an unauthorized read or write operation, for taking corrective action to erase corrupted data and/or applications associated with the detected unauthorized read or write operation, and to restore the erased data and/or applications with uncorrupted data and/or applications;

a data transfer switch that transfers data to or from the host computer; and a password controller that verifies a password received from the external source and allows access to the data transfer switch only when the password controller positively verifies the password.

28. A virus trap for protecting an associated host computer from a computer virus received from an external source, said virus trap comprising:

a mass storage device for storing data and application programs;

an embedded processor for controlling the virus trap and running the application programs;

a password controller for receiving and verifying a first-level password from the external source;

means, responsive to a positive verification of the first-level password, for receiving communications from the external source and supplying the communications to the embedded processor;

an integrity controller for monitoring the data and application programs to detect unauthorized read or write operations; and a restoration controller, responsive to a detection of an unauthorized read or write operation, for taking corrective action to erase corrupted data and/or applications associated with the detected unauthorized read or write operation, and to restore the erased data and/or applications with uncorrupted data and/or applications.

29. The virus trap of claim 28, further comprising a data transfer switch connected to the host computer, wherein access to the data transfer switch is granted only when the password controller positively verifies a second-level password received from external source.

30. The virus trap of claim 29, wherein the password controller notifies the host computer that the second-level password has been positively verified, and the host computer activates the data transfer switch in response.

31. The virus trap of claim 30, wherein the host computer activates the data transfer switch in a unidirectional mode allowing only data transfers from the host computer to the virus trap.

32. The virus trap of claim 30, wherein the host computer activates the data transfer switch in a bi-directional mode allowing data transfers from the host computer to the virus trap and from the virus trap to the host computer.

33. The virus trap of claim 32, wherein the host computer deactivates the data transfer switch if no data is transferred for a predefined time period.

34. The virus trap of claim 28, wherein the integrity controller also monitors system for the embedded processor.

35. The virus trap of claim 34, wherein the restoration controller includes a memory for storing uncorrupted operating system software for the embedded processor.

36. The virus trap of claim 35, wherein the memory in the restoration controller also stores uncorrupted data and/or application programs.

37. The virus trap of claim 28, wherein the integrity controller sends a non-maskable interrupt to the embedded processor when an unauthorized read or write operation is detected, said interrupt causing the embedded processor to send an alert to a user the host computer.

38. The virus trap of claim 37, wherein the restoration controller takes the corrective action when instructed to do so by the user of the host computer.

39. The virus trap of claim 37, wherein the restoration controller takes the corrective action automatically upon determining either (1) corruption to the data or applications programs is severe, or (2) the user of the host computer does not respond to the alert for a predefined time period.

40. The virus trap of claim 28, wherein the restoration controller performs a high-level restoration in which only data address tables are erased and restored, upon determining that the corruption to the data or application programs is not severe.

41. The virus trap of claim 28, wherein the restoration controller performs a low-level restoration in which all data, application programs, and the operating system of the embedded processor are erased and restored, upon determining that the corruption to the data or application programs is severe.

* * * * *